United States Patent [19]

Perkins et al.

[11] Patent Number: 4,900,235
[45] Date of Patent: Feb. 13, 1990

[54] REVERSIBLE PUMP ASSEMBLY

[75] Inventors: Jimmie G. Perkins, Monroe; James W. Grim, Cookeville, both of Tenn.

[73] Assignee: McCord Winn Textron Inc., Winchester, Mass.

[21] Appl. No.: 308,059

[22] Filed: Feb. 9, 1989

Related U.S. Application Data

[63] Continuation-in-part of Ser. No. 164,833, Mar. 7, 1988, Pat. No. 4,824,332.

[51] Int. Cl.4 .................. F04B 39/10; F04D 18/00
[52] U.S. Cl. ........................... 417/315; 417/442; 415/146
[58] Field of Search ............... 417/315, 560, 442; 415/146; 137/118

[56] References Cited

U.S. PATENT DOCUMENTS

| | | | |
|---|---|---|---|
| 1,687,523 | 10/1928 | Staude | 417/315 |
| 2,567,391 | 9/1951 | Mead | 417/560 |
| 2,992,652 | 7/1961 | Fellberg | 137/118 |
| 3,753,601 | 8/1973 | Hensley | 137/118 |
| 4,331,295 | 5/1982 | Warihashi | 417/442 |
| 4,600,361 | 7/1986 | Bianco | 415/38 |
| 4,653,977 | 3/1987 | Fries | 415/146 |
| 4,679,983 | 7/1987 | Pietryk | 415/146 |
| 4,728,260 | 3/1988 | Ishii | 417/442 |

FOREIGN PATENT DOCUMENTS 13672 of 1891 United Kingdom ............... 417/560

*Primary Examiner*—Donald E. Stout
*Assistant Examiner*—Eugene L. Szczecina, Jr.
*Attorney, Agent, or Firm*—John P. Moran

[57] ABSTRACT

A windshield washer pump including comprising an impeller chamber having a reversible impeller rotatably mounted therein and an inlet for windshield washer fluid communicating therewith. Dual outlets communicate between the impeller chamber and opposite ends of an adjacent outlet chamber. A piston is slidably mounted in the outlet chamber intermediate axially aligned tubular discharge passages extending from the outlet chamber. Oppositely disposed projections are formed on the piston for being alternately urged into engagement with the tubular discharge passages, permitting the alternate pumping of fluid through the tubular discharge passages.

2 Claims, 2 Drawing Sheets

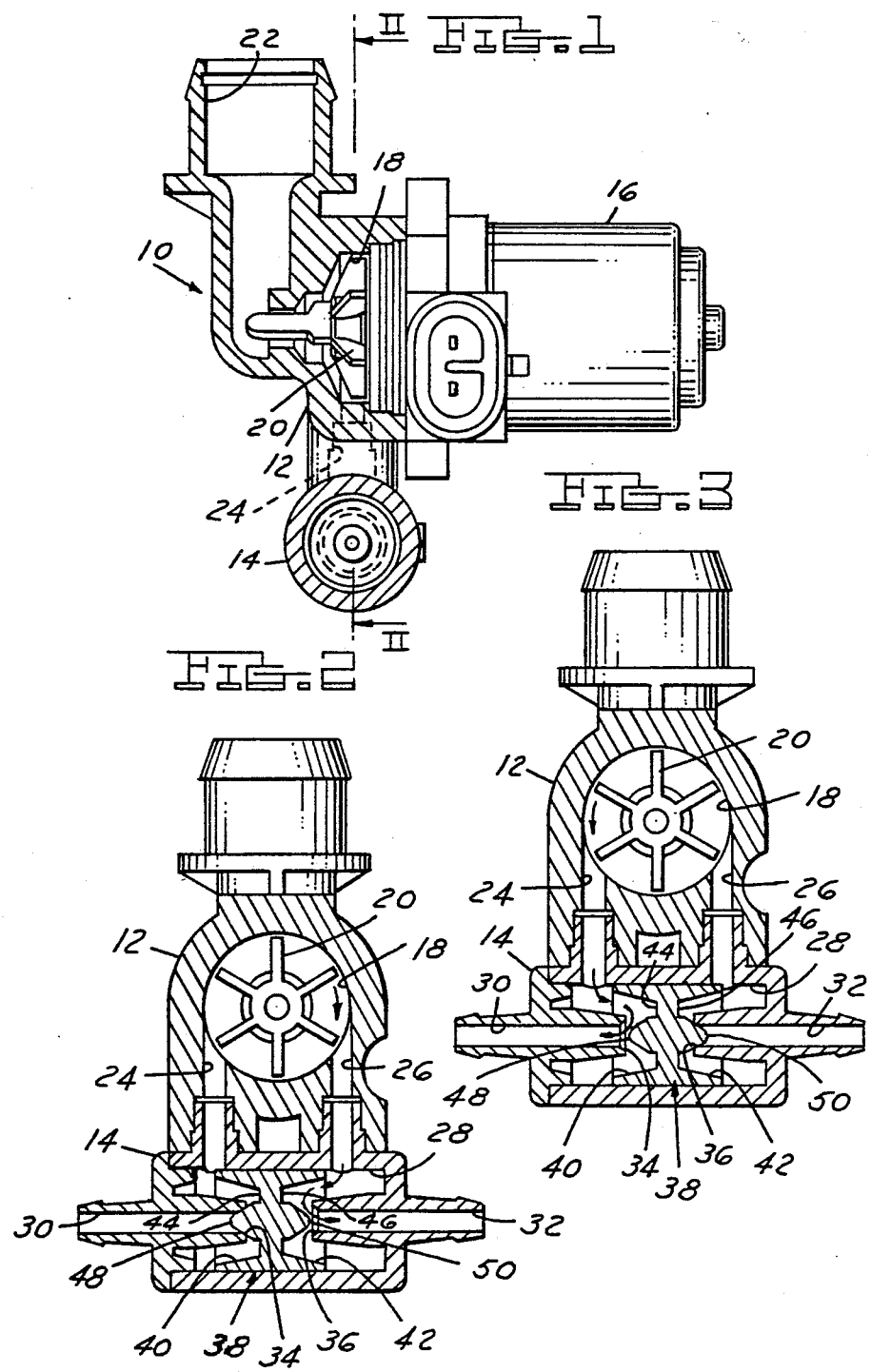

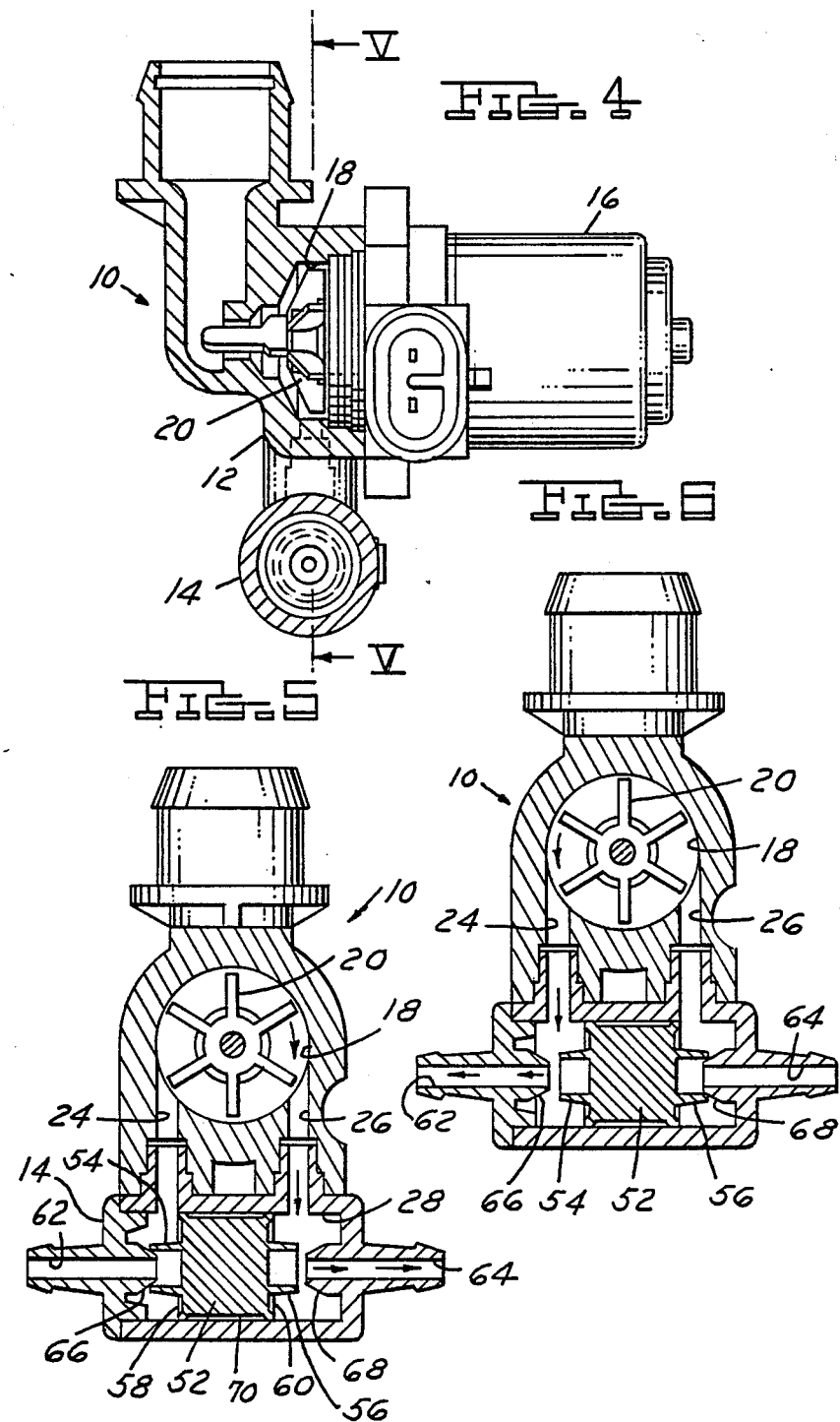

REVERSIBLE PUMP ASSEMBLY

TECHNICAL FIELD

This application is a continuation-in-part application of Ser. No. 164,833 filed Mar. 7, 1988, now Pat. No. 4,824,322.

This invention relates generally to a reversible pump assembly and, more particularly, to a window washer pump assembly and switching device adaptable to alternately providing washer fluid to either the front or back automobile windows.

BACKGROUND ART

While reversible pump assemblies are known for alternately supplying washer fluid to the front and back automotive windows, such prior devices included for example, a switching arrangement wherein a flexible membrane is clamped at its peripheral edge so as to be able to flex in either of opposite directions to seat against and seal off oppositely disposed input conduits. Such is the arrangement shown and described in Biancio U.S. Pat. No. 4,600,361. Greene U.S. Pat. No. 3,485,258 and Felberg U.S. Pat. No. 2,992,652 both teach the use of flexible diaphragms clamped at their peripheral edges. In other embodiments, Felberg includes spring loaded plungers extending in opposite directions from the diaphragm, and ball-like protrusions formed on opposite sides of the central portion of the diaphragm.

Other prior switching arrangements have included a spherical ball which is alternately shifted from being seated against one of two axially aligned openings to being seated against the other opening. For example, see Samiet U.S. Pat. No. 3,168,898 and Haight et al U.S. Pat. No. 2,778,316. Pietryk U.S. Pat. No. 4,679,983 discloses a reversible window washer unit wherein an impeller is secured to a shaft, while a sleeve-like element with two radially outwardly projecting stops is mounted by means of a slipping clutch on the shaft. The stops alternately abut against a projection intermediate two outlet ports in response to the reversed rotation of an impeller to alternately open and close the two ports.

In Gardner U.S. Pat. No. 3,038,487 there is illustrated and described a shuttle valve including a slidably mounted aluminum valve member having resilient seals mounting on the ends thereof, which serves to open and close oppositely disposed inlet ports to alternately feed fluid therefrom to a single outlet port.

Warihashi U.S. Pat. No. 4,331,295 advocates the use of two pairs of pivotally mounted check valves which respectively alternately respond to the reversing directions of an intermediate member.

DISCLOSURE OF THE INVENTION

A general object of the invention is to provide a windshield and rear window washing system including a reversible impeller and an improved switching device associated therewith.

Another object of the invention is to provide a windshield and rear window washing arrangement including a reversible impeller and an associated improved switching device having a piston effectively slidably mounted between two oppositely disposed, axially aligned outlet conduits.

A further object of the invention is to provide a reversible pump and switching device including an impeller mounted in an impeller chamber having an inlet and dual outlets leading to an outlet chamber wherein a piston having central conical shaped projections extending therefrom is slidably mounted for sealing cooperation with chamfered openings of oppositely disposed, axially aligned outlet conduits.

These and other objects and advantages will be more apparent when reference is made to the following drawings and accompanying description.

A still further object of the invention is to provide an alternate embodiment of the reversible pump and switching device, wherein the piston includes a central cylindrical projection extending therefrom.

BRIEF DESCRIPTION OF THE DRAWINGS

FIG. 1 is a side elevational view in partial cross section, of a reversible pump arrangement embodying the invention;

FIG. 2 is a cross sectional view taken along the plane of the line 2—2 of FIG. 1, and looking in the direction of the arrows; and FIG. 3 is a view similar to FIG. 2, showing a component thereof in a different operational condition.

FIG. 4 is a side elevational view in partial cross-section, of an alternate embodiment of the invention;

FIG. 5 is a cross-sectional view taken along the plane of the line 5—5 of FIG. 4, and looking in the direction of the arrows; and FIG. 6 is a view similar to FIG. 5, showing a component thereof in a different operational condition.

BEST MODE OF CARRYING OUT THE INVENTION

Referring now to the drawings in greater detail, FIG. 1 illustrates a reversible pump assembly 10 including an impeller housing 12, an outlet housing 14, and a motor housing 16. The impeller housing 12 includes a chamber 18 having an impeller 20 rotatably mounted therein, and an inlet passage 22 communicating with the chamber 18.

A pair of outlet passages 24 and 26 (FIG. 2) lead from opposite sides of the impeller chamber 18 to a chamber 28 in the outlet housing 14. Oppositely disposed axially aligned tubular passages 30 and 32 extend from the chamber 28. The inner ends of the tubular passages 30 and 32 have respective chamfered ends 34 and 36 formed thereon.

A cylindrical shaped piston 38 is slidably mounted in the chamber 28, intermediate the chamfered ends 34 and 36. The piston 38 includes conically shaped recesses 40 and 42 formed in opposite ends thereof, bottoming out in respective flat surfaces 44 and 46, on the centers of which respective bullet-nosed or substantially conically shaped projections 48 and 50 are formed for operative cooperation with the chamfered ends 34 and 36, as will be explained.

In operation, when activated in a clockwise direction (FIG. 2), the impeller 20 causes windshield washer fluid from the inlet passage 22 (FIG. 1) to be directed through the outlet passage 25 into the chamber 28, forcing the piston to move to the left in FIG. 2 until the projection 48 abuts against the chamfered end 34 of the tubular passage 30. This permits the fluid to be pumped through the tubular passage 32 to its intended destination, say, the front windshield.

When the direction of the rotation of the impeller 20 is reversed, the fluid is directed through the passage 24 to the chamber 28 to the left of the piston 38 (FIG. 3), urging the slidably mounted piston to the right to bring the projection 50 into sealing engagement with the chamfered end 36. This permits the fluid to be pumped through the tubular passage 30 to its destination, say, the rear window.

Referring now to the alternate embodiment shown in FIGS. 4-6, all elements identical to corresponding elements in FIGS. 1-3 bear the same reference numbers. As shown in FIGS. 4 and 5, a solid round piston 52 is slidably mounted in the chamber 28. Substantially cylindrical extensions 54 and 56 are formed on respective end faces 58 and 60 of the piston 52.

Oppositely disposed axially aligned tubular passages 62 and 64 extend from the chamber 28. Chamfered edges 66 and 68 are formed on the respective inner ends of the tubular passages 62 and 64. An annular peripheral clearance 70 may be formed around the piston 52.

The general operation of the FIGS. 4-6 arrangement is the same as for the FIGS. 1-3 arrangement, except that it is the distal end of the cylindrical extensions 54 and 56 which alternately abut against the respective chamfered edges 66 and 68 of the tubular passages 62 and 64 to permit fluid to be selectively pumped through one or the other of the tubular passages.

INDUSTRIAL APPLICABILITY

It should be apparent that the invention provides an improved pump and switching arrangement for a windshield and rear window washing system, including a slidably mounted piston of a particular configuration for effectively and efficiently selectively directing the fluid to either the windshield or rear window.

While but one embodiment of the invention has been shown and described other modifications are possible within the scope of the following claims.

The embodiments of the invention in which an exclusive property or privilege is claimed are defined as follows:

1. A windshield washer pump assembly comprising an impeller chamber, a reversible impeller rotatably mounted in the impeller chamber, and inlet for windshield washer fluid communicating with the impeller chamber, an outlet chamber, dual outlets communicating between the impeller chamber and opposite ends of the outlet chamber, a piston slidably mounted in the outlet chamber, axially aligned tubular discharge passages extending from the outlet chamber, oppositely disposed substantially cylindrical projections formed on said piston for being alternatively urged into engagement with said tubular discharge passages for alternatively pumping fluid through the tubular discharge passages, and chamfered ends formed on the inner ends of the respective tubular discharge passages for cooperation with said oppositely disposed substantially cylindrical projections.

2. A windshield washer pump assembly comprising an impeller chamber, a reversible impeller rotatably mounted in the impeller chamber, an inlet for windshield washer fluid communicating with the impeller chamber, an outlet chamber, dual outlets communicating between the impeller chamber and opposite ends of the outlet chamber, a solid round piston slidably mounted in the outlet chamber, a axially aligned tubular discharge passages extending from the outlet chamber, oppositely disposed substantially cylindrical projections formed on said piston for being alternatively urged into engagement with the adjacent ends of said tubular discharge passages for alternately pumping fluid through the tubular discharge passages, with said solid round piston having flat end faces formed in opposite ends thereof, said substantially cylindrical projections being formed on respective flat end faces.

* * * * *